No. 746,063. PATENTED DEC. 8, 1903.
G. B. FYFE.
COFFEE PERCOLATOR.
APPLICATION FILED APR. 3, 1903.
NO MODEL.

Witnesses: Inventor:

No. 746,063.

Patented December 8, 1903.

UNITED STATES PATENT OFFICE.

GEORGE B. FYFE, OF CHICAGO, ILLINOIS, ASSIGNOR OF ONE-HALF TO W. N. GREEN, OF CHICAGO, ILLINOIS.

COFFEE-PERCOLATOR.

SPECIFICATION forming part of Letters Patent No. 746,063, dated December 8, 1903.

Application filed April 3, 1903. Serial No. 150,898. (No model.)

*To all whom it may concern:*

Be it known that I, GEORGE B. FYFE, a citizen of the United States, residing at Chicago, in the county of Cook and State of Illinois, have invented certain new and useful Improvements in Coffee-Percolators, of which the following is a specification.

This invention relates to percolators for use in coffee pots or urns in the making of what is known as "French" or drip coffee.

The object of the invention is to provide an improved construction in devices of this character; and it consists in the matters herein set forth, and particularly pointed out in the appended claims.

Figure 1:
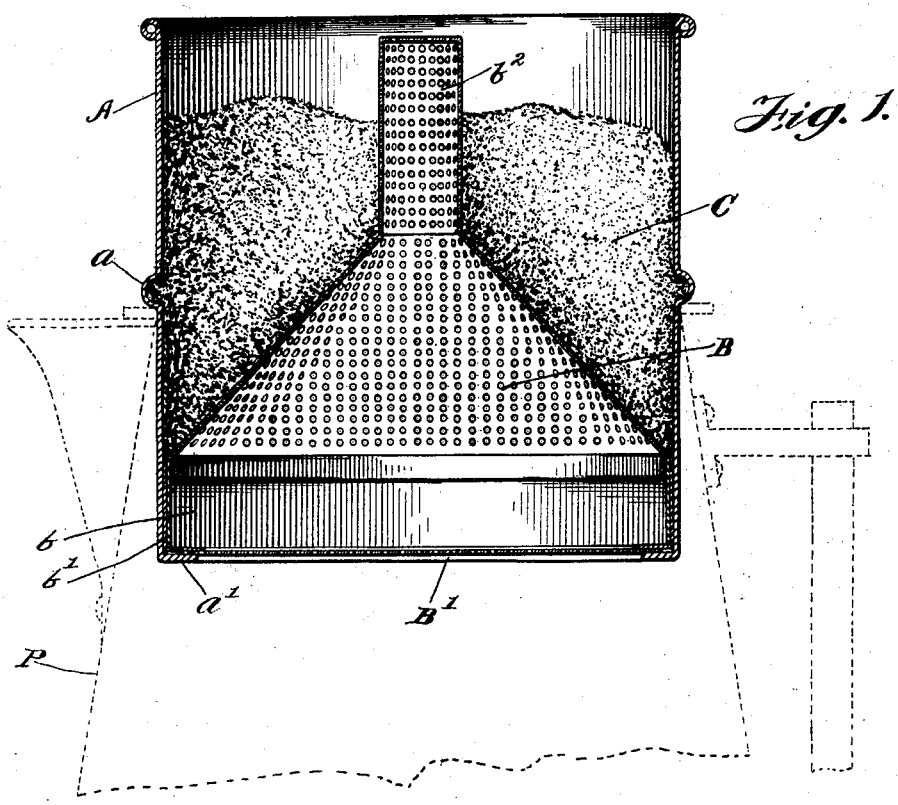
Figure 2:
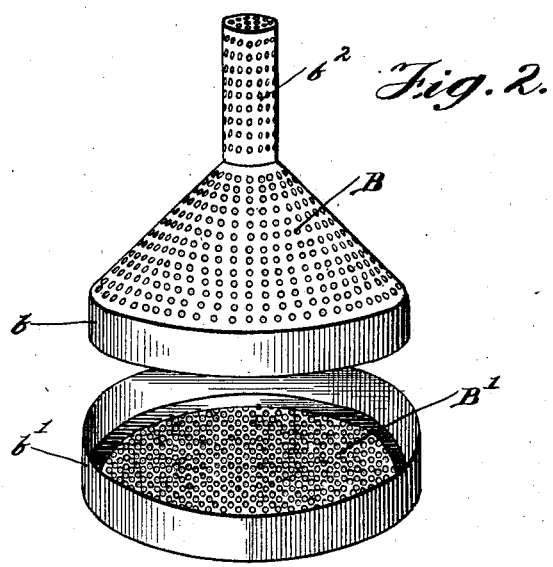

In the accompanying drawings, Figure 1 is a sectional side elevation of a percolator constructed in accordance with my improvements in one form. Fig. 2 is a perspective detail of the interior parts of the percolator separated from each other and removed from the receptacle or casing which commonly incloses them when in use.

In said drawings, A designates the outer casing or receptacle of my improved percolator, which conveniently and as herein shown is made in the form of an open-ended cylindric cup adapted to fit down into the mouth of a coffee pot or urn P. (Indicated in dotted lines in Fig. 1.) In the present instance this cup is made of sheet metal drawn from a single piece and is provided midway of its height with an outwardly-projecting bead $a$, adapted to rest upon the rim of the coffee pot or urn, and at its base with an inwardly-projecting flange $a'$, upon which the strainer of the percolator rests. This strainer is in itself a hollow vessel consisting of an upper or body portion B and a lower portion or base B', the two parts being desirably made separable to facilitate cleaning and being to this end formed with interfitting cylindric flanges $b$ and $b'$, that telescope together to form a substantially tight joint between the body and base. The upper or body portion B of the strainer is of conical shape and is made of perforated sheet metal or foraminous material and terminates at its apex in a cylindric cup $b^2$ of similar material. The under surface or end of the lower portion or base B' is likewise formed of perforated sheet metal or foraminous material, but is of considerably finer mesh than that which forms the conical upper portion B.

In the use of the percolator thus described the cup or receptacle A sets into the mouth of the coffee pot or urn, as shown in Fig. 1, and the closed strainer B sets into the cup A and rests upon the inturned base-flanges $a'$ thereof. The coffee C is turned into the cup A upon and around the strainer, so that it rests and is supported upon its conical body and may extend up along the apex cup B to a greater or less extent. Boiling water is then poured into the top of the cup A and allowed to percolate down through the coffee and through the strainer into the coffee pot or urn, and usually is then turned back into the cup A and allowed to percolate through a second time and as often as deemed necessary to secure the desired strength. This general operation is of course similar to that of previous constructions of this character; but the advantage of the present improvement lies particularly in the fact that the coffee is supported in such a manner that it does not pack down when wet, so as to seriously interfere with the flow of liquid through it, and consequently avoids the delay generally experienced in getting the liquid through, particularly when poured in the cup the second or third time. The double construction of the strainer also enables its body portion, which directly supports the coffee, to be made with large enough apertures or meshes to permit a free flow of the liquid, whatever small particles of coffee pass through these larger apertures or meshes with the liquid being caught within the strainer by the finer meshes of its lower straining-surface, so that only the clear decoction is finally admitted to the pot or urn beneath.

I claim as my invention—

1. A coffee-percolator comprising an outer cup adapted to engage a coffee pot or urn, and a hollow strainer inserted within the outer cup and comprising a conical body portion of foraminous material, and a separable base portion having its bottom wall of foraminous material, substantially as described.

2. A coffee-percolator comprising an outer cup adapted to engage a coffee pot or urn, and a hollow strainer inserted within the outer cup and comprising a conical body portion of foraminous material, and a base portion having its bottom wall of finer mesh than its body portion, substantially as described.

3. A coffee-percolator comprising an outer cup adapted to engage a coffee pot or urn, and a hollow strainer inserted within the outer cup and comprising a conical body portion made of foraminous material and formed at its apex with a tubular extension of like material, and a transverse base-wall for the strainer also made of foraminous material, substantially as described.

4. A coffee-percolator comprising an outer cup adapted to set within the mouth of a coffee pot or urn and provided with an inwardly-projecting bottom flange, and a hollow strainer inserted within the hollow cup and resting upon said flange, the body of said strainer being made conical and large enough at its bottom to substantially fill the cup and being formed at its apex with an upwardly-projecting tubular extension, and the base of the strainer being made of a flange which telescopes over a coacting depending flange on the body portion, said body and base being formed of foraminous material and the base being of finer mesh, substantially as described.

In testimony that I claim the foregoing as my invention I affix my signature, in presence of two subscribing witnesses, this 9th day of March, A. D. 1903.

GEO. B. FYFE.

Witnesses:
HENRY M. CARTER,
R. A. COSTELLO.